United States Patent [19]

Hofmann et al.

[11] Patent Number: 4,869,800
[45] Date of Patent: Sep. 26, 1989

[54] CELL ARRANGEMENT FOR A FILTER PRESS TYPE STACK OF CELLS

[75] Inventors: Hans Hofmann, Muehlheim; Hartmut Wendt, Dieburg, both of Fed. Rep. of Germany

[73] Assignee: Messerschmitt-Boelkow Blohm GmbH, Munich, Fed. Rep. of Germany

[21] Appl. No.: 214,494

[22] Filed: Jul. 1, 1988

[30] Foreign Application Priority Data

Jul. 1, 1987 [DE] Fed. Rep. of Germany ....... 3721753

[51] Int. Cl.⁴ .................. C25B 9/04; C25B 11/03; C25B 11/04
[52] U.S. Cl. .................................. 204/253; 204/283; 204/284; 204/289; 204/290 R
[58] Field of Search ............... 204/286, 252, 283, 284, 204/290 R, 279, 253–258, 288, 289

[56] References Cited

U.S. PATENT DOCUMENTS

| | | | |
|---|---|---|---|
| 3,873,437 | 3/1975 | Pulver | 204/286 X |
| 3,926,773 | 12/1975 | Koziol et al. | 204/290 R X |
| 4,141,815 | 2/1979 | Ichisaka et al. | 204/254 X |
| 4,746,415 | 5/1988 | Boulton et al. | 204/286 X |

FOREIGN PATENT DOCUMENTS 1178179  1/1970  United Kingdom .

*Primary Examiner*—Donald R. Valentine
*Attorney, Agent, or Firm*—W. G. Fasse; D. H. Kane, Jr.

[57] ABSTRACT

An electrical contact to a porous metal layer forming an anode of a diaphragm cell in a stack of such cells, is established by sintering a plurality of metal platelets into the porous metal layer. Preferably, the sintering-in of the platelets takes place simultaneously with the sintering of the porous metal layer. Each platelet is provided with an electrical contact metal pin extending out of the porous metal layer.

9 Claims, 1 Drawing Sheet

CELL ARRANGEMENT FOR A FILTER PRESS TYPE STACK OF CELLS

FIELD OF THE INVENTION

The invention relates to a cell arrangement for a filter press type stack of cells. More specifically, the invention relates to an anode construction for such a cell for supplying electrical current to the porous anode of a bi-polar plate forming such a cell, for example, in a stack of cells arranged in a filter press type stack, whereby the anode is a porous metal layer formed by reduction sintering of a metal oxide coating or layer.

DESCRIPTION OF THE PRIOR ART

The electrodes of conventional bi-polar plates or cells suitable for such a cell stack are formed by screen or perforated sheet metal members, whereby an electrical contact for the current supply may be formed either by point welding or by pressing a contact element against the screen or perforated member.

German Patent Publication (DE-OS) No. 3,224,555 discloses the production of porous metal layers by a reduction sintering of a metal oxide layer to form electrodes. It has been found that it is possible to assure a sufficient current supply and also a satisfactory current distribution in connection with such electrodes by merely pressing one or several distributed contacts against such a porous metal layer forming a cathode. However, in connection with porous metal layers which were produced by a reduction sintering to form an anode, a satisfactory current supply and distribution is not possible.

OBJECTS OF THE INVENTION

In view of the foregoing it is the aim of the invention to achieve the following objects singly or in combination:

to provide a bi-polar plate or cell with such an anode structure that a satisfactory current supply and distribution is achieved even if the anode is produced by a reduction sintering of a metal oxide layer;

to provide a cell structure suitable for stacking in the manner of a filter press stack while assuring a satisfactory current supply to all anodes in the stack; and to provide a method for producing such an anode construction.

SUMMARY OF THE INVENTION

According to the invention a cell arrangement for a filter press type stack comprises a diaphragm, a porous metal layer forming an anode on one side of the diaphragm, a cathode on the opposite side of the diaphragm also in the form of a porous metal layer, and means for supplying electrical current to the anode including at least one metal platelet sintered into the porous metal layer forming the anode. Thus, the anode construction according to the invention includes a porous metal layer which is formed by a reducing sintering from a metal oxide layer, and at least one metal platelet sintered into the porous metal layer, preferably together with the sintering of the metal oxide layer forming the anode.

According to the invention the anode with its current supply means is formed as follows. A first coating of a reducible metal oxide is applied to one surface of a diaphragm. At least one conductor metal platelet is inserted into the first coating or into the recess or recesses. Thereafter, the conductor metal platelet or platelets on or in the first coating are covered with a sinterable second coating which, at least after the sintering, becomes electrically conducting. Preferably, but not necessarily, at least one recess is formed in the first coating which will be transformed into a porous metal layer to form the anode. A plurality of such recesses may be provided in the first coating. In the last step the first and second coatings are simultaneously sintered to form the porous metal layer as the anode and to simultaneously bond the conductor metal platelets to the anode and to simultaneously bond the conductor metal platelets to the anode or into the recesses of the anode, whereby a good electrical contact surface for the platelets and thus for the anode is achieved.

By embedding the conductor metal platelets and/or by sintering the conductor metal platelets into the porous anode layer, during the reductive sintering of the porous anode layer, a crystalline metallic bonding is achieved between the porous anode layer and the metal platelet, whereby good electrical contacts result for the anode because the formation of a high ohmic resistance as a result of a barrier oxide layer between the porous anode layer and the metal platelet is prevented.

By giving the metal platelets a polygonal configuration, preferably a star-shape, an improved current distribution is achieved, whereby any voltage drop across the anode is further reduced. Thus, according to the invention, very high currents may be introduced into the anode even if the anodes are rather thin, for example having a thickness of about 0.2 to about 0.5 mm. Such anodes in the form of sintered metal electrodes are used for the advanced alkaline water electrolysis and in fuel cells, for example.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
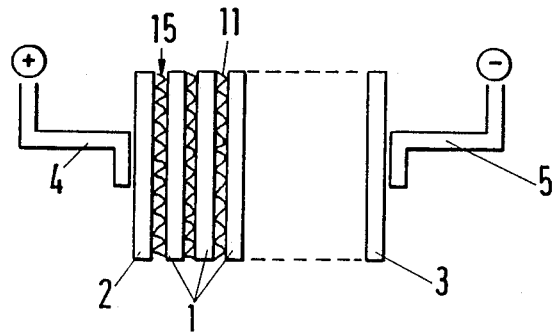
FIG. 1 is a side view of a stack of cells or bi-polar plates arranged in the manner of a filter press stack.

Referring to FIG. 1, the stack comprises a plurality of bi-polar cells 1 arranged between end plates 2 and 3. The end plate 2 forms an anode since it is connected through a copper rail 4 to the positive terminal of a d.c. power supply not shown. The end plate 3 forms a cathode connected through a copper rail 5 to the negative terminal of the d.c. power supply. Spacings 15 are provided between neighboring cells 1 and between the end plates and the respective neighboring cell. Contact improving perforated contact members 11 in the form of corrugated sheet metal members are inserted in these spacings.

Figure 2:
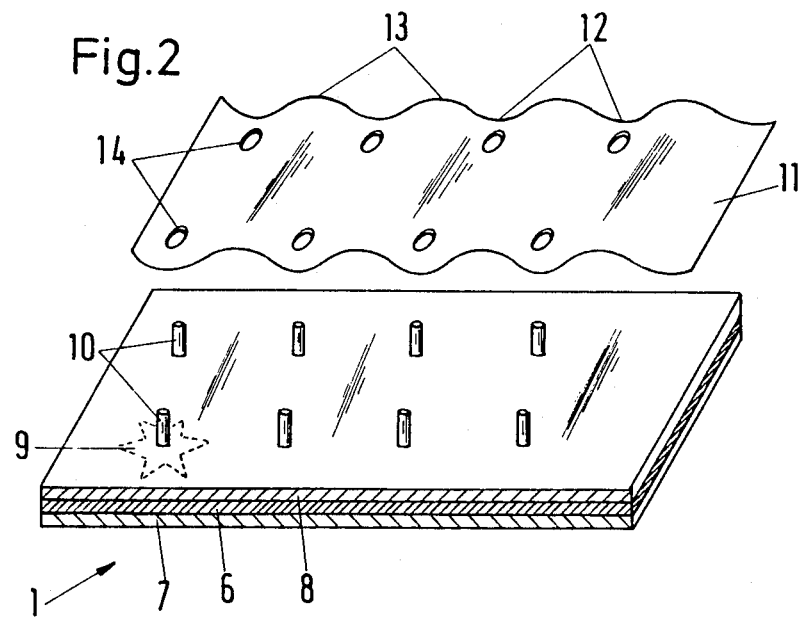
FIG. 2 is a perspective view of a bi-polar plate prior to its assembly with a perforated contact sheet metal member.
Figure 3:
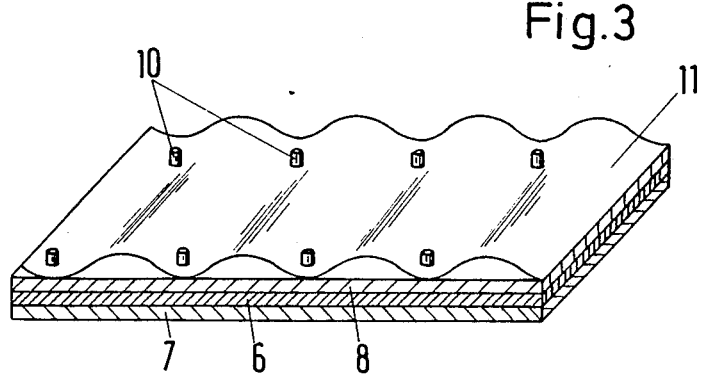
FIG. 3 is a perspective view similar to that of FIG. 2, but showing a cell after its assembly with the perforated contact sheet metal member.

Referring to FIGS. 2 and 3, the contact corrugated sheet metal members 11 have perforations 14 arranged in valleys 12 between ridges 13.

Each bi-polar plate or cell comprises a diaphragm 6 in the form of a cermet, a cathode 7, and an anode 8 in the form of porous metal layers formed by a reducing sintering of a metal oxide layer or coating. According to the invention polygonal, for example star-shaped conductor metal platelets 9, are embedded in the anode layer 8. Each platelet is provided with a contact pin 10 which is secured in a conventional manner to the platelet, for example by brazing, or as a result of the sintering. The sheet metal corrugated contact member 11 contacts with its valley bottoms, the anode 8, whereby the contact pins 10 of the platelets 9 extend through the perforations 14. The pins 10 fit snuggly into the perforations 14 to provide a good electrical contact. The ridges 13 then contact the neighboring cathode 7 of the neighboring cell in the stack. Preferably, the pins 10 are welded to the member 11 after the member 11 is placed in position with the pins extending through the apertures 14 to further improve the electrical contact. The sheet metal member 11, due to its corrugation, has a certain springiness to assure a good electrical contact between neighboring anodes and cathodes in the stack. The above mentioned spacings 15 in which the contact sheet metal members 11 are received, provide also space for the electrolyte.

The anode 8 is formed, for example, by applying a reducible metal oxide paste to one surface of the diaphragm layer 6, whereby a screen printing method may be used. The screen printing is performed according to the invention in such a way that preferably recesses are formed in the metal oxide layer for receiving the conductor metal platelets 9. The recesses will have the same configuration as the polygonal configuration of the platelets, for example, in a star-shaped configuration as shown in FIG. 2. Such screen printing may be directly applied to the diaphragm layer 6. After the platelets 9 have been inserted into the recesses of the screen printed metal oxide layer, the platelets 9 are also covered with a second sinterable metal coating or with a second sinterable metal oxide coating, such as a metal oxide paste so that in the subsequent reducing type of sintering a homogeneous bonding between the anode layer 8 and the platelets 9 is assured. The reducible metal oxide paste of the above mentioned first coating and the second sinterable metal coating comprise a metal selected from the group including metals from the first, second, and eighth subgroup of the periodic table. The second coating may also be a metal oxide which is reducible by the sintering step. A metal powder or metal oxide powder may be used for the second coating. Reducible metal oxides such as nickel oxide, cobalt oxide, and iron oxide are suitable and so are mixtures of these metal oxides.

The configuration and distribution of the metal platelets 9 in the anode layer 8 depends on the desired current density and/or the desired current distribution. For example, the metal platelets 9, as shown in FIGS. 2 and 3, may, for an improved electrical contact, be connected to the sheet metal member 11 through the mentioned contact pins 10. However, such contact pins are not indispensible. It is also possible to contact the metal platelets 9 directly with the contact member 11. For this purpose, certain surface portions of the platelets 9 are not coated with the metal coating or with the metal oxide paste coating so that a sufficiently good electrical contact may be achieved by simply pressing the contact sheet metal member 11 onto these uncoated portions of the platelets 9.

Although the invention has been described with reference to specific example embodiments, it will be appreciated, that it is intended to cover all modifications and equivalents within the scope of the appended claims.

What we claim is:

1. A cell arrangement for a filter press type of stack, comprising a diaphragm, a porous metal layer forming an anode on one side of said diaphragm, said porous metal layer having at least one recess therein, a cathode on an opposite side of said diaphragm, means for supplying electrical current to said anode and at least one conductor metal platelet sintered into said recess in said porous metal layer forming said anode for providing an improved electrical current flow and distribution into said porous metal layer forming said anode.

2. The cell arrangement of claim 1, wherein metal platelet has a polygonal configuration.

3. The cell arrangement of claim 1, further comprising a corrugated sheet metal member having ridges (13) and valleys (12) arranged so that said valleys are in contact with said metal platelets and so that said ridges are in contact with a cathode of a neighboring cell in a stack.

4. The cell arrangement of claim 3, further comprising contact pins secured to said metal platelets, said contact pins extending out of said porous metal layer and into holes in said valleys of said corrugated sheet metal member for establishing an improved electrical contact with said cathode of said neighboring cell.

5. An anode for a cell of a filter press type stack, comprising a porous metal layer forming said anode, at least one recess in said porous metal layer anode, and at least one conductor metal platelet sintered into said recess of said porous metal layer anode for providing an improved electrical current flow and distribution into said porous metal layer anode.

6. The anode construction of claim 5, futher comprising at least one electrically conducting contact pin secured to its respective metal platelet, said contact pin extending through and out of said porous metal layer.

7. The anode construction of claim 6, further comprising a corrugated sheet metal member having valleys with at least one hole therein through which said contact pin extends.

8. An anode and diaphragm construction for a cell of a filter press type stack, comprising a diaphragm, a sintered porous metal coating on one surface of said diaphragm, a number of recesses in said sintered metal coating, an electrical conductor metal platelet in each of said recesses, and a further sintered electrically conducting coating on said first sintered coating and on said conductor metal platelets, whereby said conductor metal platelets are bonded into said sintered coatings to provide a good electrical contact surface for said platelets and said anode.

9. The construction of claim 8, wherein said sintered second electrically conducting coating is a sintered metal powder.

* * * * *